Nov. 17, 1964    G. S. DONEV    3,157,263
PARKING METER WITH USER IDENTIFICATION
Filed July 9, 1963    2 Sheets-Sheet 1
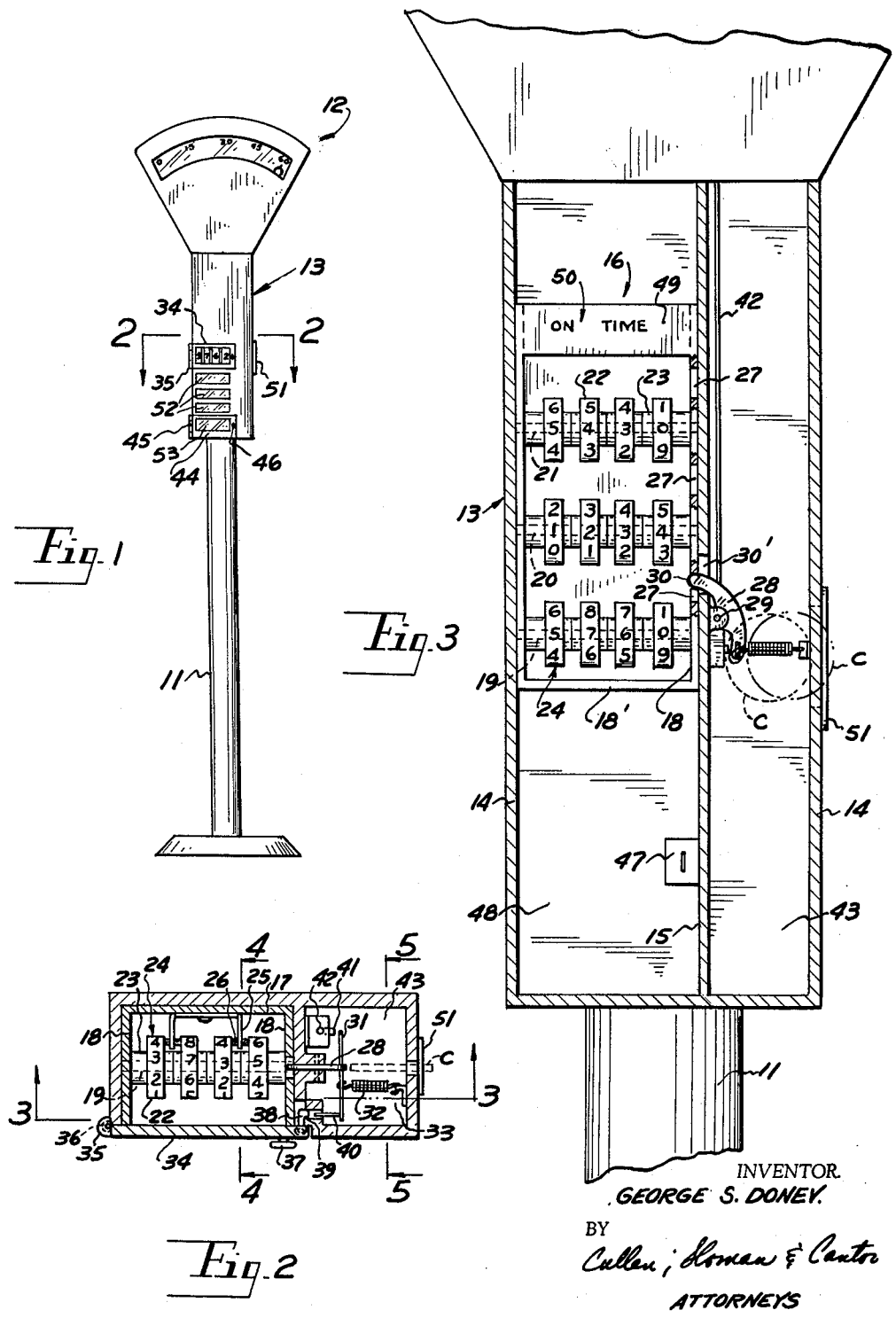
INVENTOR.
GEORGE S. DONEV.
BY
Cullen, Sloman & Cantor
ATTORNEYS Nov. 17, 1964   G. S. DONEV   3,157,263
PARKING METER WITH USER IDENTIFICATION
Filed July 9, 1963   2 Sheets-Sheet 2
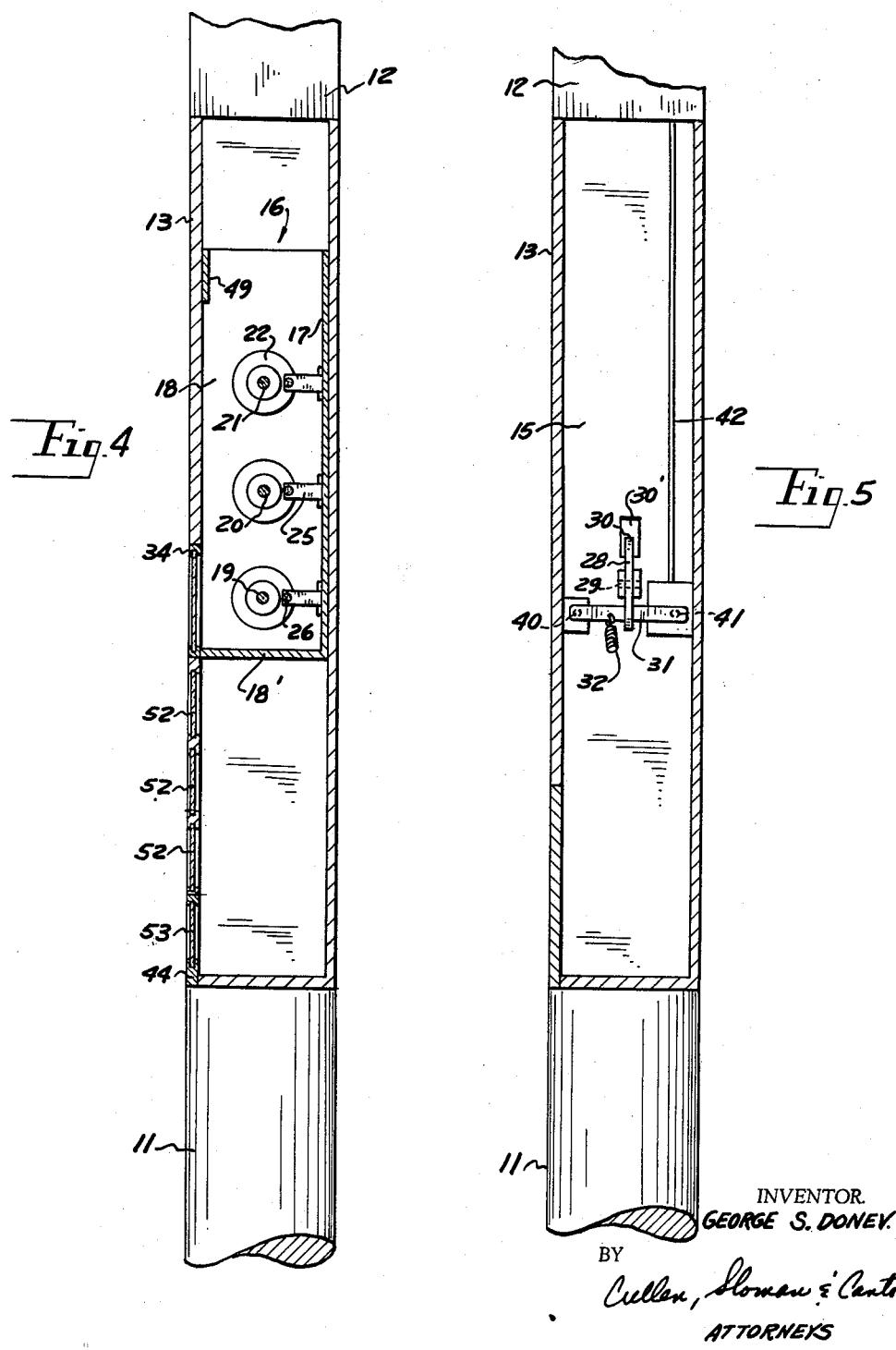
INVENTOR.
GEORGE S. DONEV.
BY
ATTORNEYS

United States Patent Office 3,157,263
Patented Nov. 17, 1964

3,157,263
PARKING METER WITH USER IDENTIFICATION
George S. Donev, 24312 Annapolis, Dearborn, Mich.
Filed July 9, 1963, Ser. No. 293,625
2 Claims. (Cl. 194—54)

The present invention relates to parking meters, and more particularly to a customer identification device for use therewith.

Heretofore, it has been common practice for drivers to utilize the unexpired time at a parking meter, paid for by the previous user. In some cities and localities it is an advantage to the civic authorities that this "so-called" free parking be eliminated in order to increase revenue, at least from the city's viewpoint.

For this purpose it is an object of this invention to provide a customer identification device for use in connection with a parking meter by which at the time a coin is inserted to activate the parking meter, a means is provided under the control of the customer for identifying this customer with the particular meter.

It is another object to provide in connection with a parking meter a customer actuated identification means in the nature of a supporting member within a housing associated with the parking meter which carries a series of parallel spaced wheels journaled thereon and wherein each wheel has upon its exterior peripheral edge a series of different digits or indicia by which the user may rotate said wheels so as to indicate through a suitable window the license number of the parked car for which parking time has been paid.

The result of this would be that should someone attempt to use the unexpired time of a previous user the license number of the parked car would not match the license number showing in the meter at a window, and the parker could be ticketed.

These and other objects will be seen from the following specification and claims in conjunction with appended drawings in which:

FIG. 1 is a front elevational view of a parking meter incorporating the present invention.

FIG. 2 is a section taken in the direction of arrows 2—2 of FIG. 1.

FIG. 3 is an enlarged vertical section of the front portion of the housing which incorporates the present customer identification means with the cover removed for illustration, being a section taken in direction of arrows 3—3 of FIG. 2.

FIG. 4 is a fragmentary vertical section taken in the direction of arrows 4—4 of FIG. 2.

FIG. 5 is a fragmentary vertical section taken in the direction of arrows 5—5 of FIG. 2.

It will be understood that the above drawings illustrate merely a preferred embodiment of the invention, and that other embodiments are contemplated within the scope of the claims hereafter set forth.

Referring to the drawings, the present parking meter includes support pedestal 11 having mounted at its upper end a parking meter of conventional design generally indicated at 12.

Housing for User Identification

The customer identification device associated with the present meter is embodied within housing 13 mounted on the pedestal adjacent meter 12. Said housing includes upright side walls 14, and upright partition 15 to define chamber 48, FIG. 3, within which is movably positioned and adjustably mounted an elongated frame 16.

Adjustable Frame

The frame includes rear wall 17, opposed side walls 18, and bottom wall 18'. A series of vertically spaced parallel supports 19, 20 and 21 are mounted at their ends between side walls 18. Each support has mounted thereon a series of parallel spaced wheels 22 with suitable spacers or hubs 23 interposed. Each wheel has formed on its outer peripheral surface a series of indicia or numerals, such as the numerals 1 through 10, best shown in FIGS. 2 and 3, as at 24.

A friction braking device is provided in the nature of a clip 25 rearwardly of each support anchored to rear wall 17. Each clip includes at its free ends the inwardly projecting friction elements 26 adapted to frictionally engage the sides of the respective wheels 22 to limit rotary movements and to retain the wheels in particularly manually adjusted positions.

Within the inner upright side wall 18 of frame 16 there are a series of vertically spaced transverse apertures 27, which are adjacent partition 15 and adapted for alternate registry with the transverse slot 30' formed in said partition.

The detent 28 is centrally and pivotally mounted at 29 upon the far side of partition 15 so that its free end 30 projects movably through slot 30' and selectively into one of the slots 27 in frame wall 18 for supporting said frame in a desired vertically adjusted position. Bar 31 is secured to and extends transversely of detent 28, FIGS. 2, 3 and 5, and is normally urged rearwardly to maintain the detent in the frame supporting position shown by coil spring 32 anchored at 33 to housing side wall 14.

Hinged Door With Window

The front wall of housing 13 is suitably apertured, and mounted within said aperture is the windowed door 34 hinged thereto at 35 and incorporating a coiled spring 36 within the hinge assembly normally biasing door 34 to the closed position shown in FIG. 2.

Said door, which is normally locked by latch 38 engageable with a portion of housing 13 as at 39, FIG. 2, includes a handle 37 by which the door may be opened by the user once the latch has been disengaged.

For this purpose a plunger 40 is mounted adjacent one end of bar 31 and is normally in lateral registry with the flexible end portion of latch 38. Upon application of a coin C through coin receiver 51, FIGS. 2 and 3 said coin is effective for projecting detent 28 inwardly at its lower end. Bar 31 in turn projects plunger 40 so as to deflect the latch 38 disengaging the same so that door 34 may be manually opened. The door is located opposed from shaft 19, FIG. 3.

Operation

In normal operation before coin C is inserted, detent 28 is supportably engaging frame 16, that is under bottom wall 18', with the frame elevated from the position shown in FIG. 3. Upon projection of the coin within receiver 51, said coin operatively engages detent 28 below its pivotal mounting 29 causing a pivotal clockwise movement thereof against the action of coil spring 32 momentarily disconnecting the detent end portion 30 from frame 16 permitting said frame 16 to fall a short distance by gravity.

Since coin C immediately drops into chamber 43 in the said housing, the detent is free to return under the action of the spring so as to supportably engage the frame 16 through the adjacent aperture 27 as shown in FIG. 3.

During this process, namely the introduction of coin C, plate 31 and plunger 40 have been projected inwardly disengaging latch 38 permitting manual opening of door 34.

With the door open the customer manually turns the individual wheels 22 on support 19 so that his license number appears at the window at the front of the housing, FIG. 1, to thus provide a ready identification of the customer who has paid for parking.

When the coin is projected inwardly, bar 31 is actuated to engage contact 41 or other operating member causing a longitudinal movement of the meter control member 42 which is connected with the meter in any suitable fashion for cocking the same, such as to the unexpired position shown in FIG. 1.

A second door 44 is mounted upon the front of housing 13 by hinges 45 and is provided with a lock and/or key opening 46 in registry with stop 47 on partition 15, FIG. 3, by which the housing may be opened by an officer from time to time who carries a key for the purpose of resetting frame 16, such as to the position shown in FIG. 3 or to a position wherein the set of wheels on support 19 is elevated above the position shown in FIG. 3.

Each time a customer seeks to park at the meter, and a coin is projected thereinto at 51, detent 28 is activated to again release frame 16 which falls by gravity a short distance until the next succeeding set of wheels, such as on support 20, is presented to the window of door 34. This continues until all the sets of wheels have been utilized, such as those on support 21.

Thereafter, the very next customer on projection of a coin into the meter will permit the downward movement of frame 16 so that the term "ON TIME" will show up as at 50 on transverse panel 49 at the upper end of the frame 16. This shows, that the person parked at that time is properly parked; until such time as an officer has access to chamber 48 and re-elevates frame 16 to or above the position shown in FIG. 3.

While a limited number of roll supports 19, 20 and 21 have been shown for illustration, it is contemplated that any number of supports and corresponding series of wheels could be provided as desired.

The invention therefore is primarily directed to a means by which a person parking at a meter may dial an identification of the parked vehicle by turning the wheels manually to the identification of his license number, for illustration.

The simplest form would merely provided a dial upon the interior of a locked windowed door which may be opened upon projection of the coin, for dialing manually the particular number. This could be accomplished using one set of rolls, or a plurality of rolls on the vertically adjustable frame 16.

Additional windows 52 are located in the front wall of housing 13 and the window 53 in door 44, arranged oppositely from the repsective number wheels on the supports 19, 20 and 21.

Thus, it is impossible for an unauthorized person to cause embarrassment and ticketing of a parked car for which time has been paid. Should an individual place a coin in the meter causing the frame to drop and then dial a new set of numbers not matching the license number of the parked car, then the officer would see such correct number at one of the additonal windows 52, and know that the car is nevertheless properly parked and paid. If an officer finds a car parked with the meter showing "ON TIME" through the window door 34, he can open the door 44 with a suitable key manually rotate the bottom row of wheels corresponding to support 19 thus dialing the license number of the car parked, and thereafter elevate the frame until this latter set of numbers shows through the window door 34.

Thus, no one can be unlawfully ticketed and no one can unlawfully get away without paying for parking.

Having described my invention, reference should now be had to the following claims.

I claim:

1. In a parking meter, the invention comprising a housing on the meter; and a customer actuated identification means mounted within the housing and variably adjustable therein to visibly indicate the license numbers of successively parked vehicles, said identification means including a support;

and a series of parallel spaced wheels loosely journaled on the support, each wheel having upon its exterior peripheral edge a series of different digits or indicia;

resilient means on said housing projecting between and frictionally engaging pairs of said wheels limiting free rotation thereof and retaining said wheels in adjusted position;

and a spring biased door having a window hinged on the housing opposite said series of wheels and openable for manual access to said wheels;

a latching means normally maintaining the door closed;

and a coin controlled means on the housing to release the latch means permitting manual opening of the door for manual access to said wheels.

2. In a parking meter, the invention comprising a housing on the meter; and a customer actuated identification means mounted within the housing and variably adjustable therein to visibly indicate the license numbers of successively parked vehicles, said identification means including a hollow elongated frame slidably mounted within said housing for vertical movements;

a series of vertically spaced parallel supports within said frame;

a series of parallel spaced wheels loosely journaled on each support, each wheel having upon its exterior peripheral edge a series of different digits or indicia;

a spring biased door with a window hinged upon the housing opposite one of said supports;

and a spring biased releasable detent pivotally mounted on the huosing supportably registerable with said frame to progressively present each support and its series of wheels in front of said door window;

whereby a coin projected into said housing to actuate said meter operatively engages said detent to momentarily release said frame permitting it to fall a short distance before re-engagement by said detent to successively present the next adjacent support and series of wheels to said window.

References Cited in the file of this patent

UNITED STATES PATENTS

| | | |
|---|---|---|
| 2,309,055 | Ferris | Jan. 19, 1943 |
| 2,670,066 | Bruce | Feb. 23, 1954 |